(12) United States Patent
Matsuda et al.

(10) Patent No.: US 9,038,190 B2
(45) Date of Patent: May 19, 2015

(54) COMMUNICATION APPARATUS THAT COMMUNICATE IN DIFFERENT SECURITY LEVELS AND COMPUTER-READABLE MEDIA FOR CONTROLLING SUCH APPARATUS

(75) Inventors: Munehisa Matsuda, Nagoya (JP); Yohei Maekawa, Nagoya (JP); Takeshi Miyake, Nagoya (JP); Yuki Yada, Kuwana (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 292 days.

(21) Appl. No.: 13/410,055

(22) Filed: Mar. 1, 2012

(65) Prior Publication Data
US 2012/0233702 A1 Sep. 13, 2012

(30) Foreign Application Priority Data
Mar. 11, 2011 (JP) .................. 2011-054069

(51) Int. Cl.
*H04L 29/06* (2006.01)
*G06F 21/60* (2013.01)

(52) U.S. Cl.
CPC .................................. *G06F 21/608* (2013.01)
USPC ............. 726/26; 709/223; 709/224; 709/227; 709/228; 709/238; 713/150; 713/153; 713/156; 713/158; 713/159; 713/168; 358/1.11; 358/1.12; 358/1.13

(58) Field of Classification Search
CPC .............. H04L 63/0823; H04L 63/166; H04L 63/0227; H04L 63/12; H04L 63/20
USPC ........ 358/1.11–1.13; 713/150, 153, 156, 158, 713/159, 168; 726/26; 709/223, 224, 227, 709/228, 238
See application file for complete search history.

(56) References Cited

U.S. PATENT DOCUMENTS 7,457,417 B1 * 11/2008 Mirza-Baig ................... 380/270
8,166,525 B2 * 4/2012 Gaucas et al. .................... 726/5
(Continued)

FOREIGN PATENT DOCUMENTS

JP 2001-237820 A 8/2001
JP 2002-207636 A 7/2002
(Continued)

OTHER PUBLICATIONS

Japan Patent Office, Notice of Reasons for Rejection for Japanese Patent Application No. 2011-054069 (related to above-captioned patent application), mailed Feb. 18, 2014.
(Continued)

*Primary Examiner* — Hadi Armouche
*Assistant Examiner* — Hee Song
(74) *Attorney, Agent, or Firm* — Baker Botts L.L.P.

(57) ABSTRACT

A communication apparatus may include a reception portion, a decision portion, and a transmission portion. The reception portion may receive a first data request transmitted through a first security level communication, and a second data request transmitted through a second security level communication, the second security level being more secure than the first security level. The decision portion may decide whether a specific data request is the first data request or the second data request. The transmission portion may transmit a specific data to an apparatus that is a transmission source of the specific data request if the specific data request is the second data request, and may transmit different data to the apparatus if the specific data request is the first data request. The different data contains display information for causing the apparatus to retransmit the specific data request through the second security level communication.

11 Claims, 11 Drawing Sheets

(56) References Cited

U.S. PATENT DOCUMENTS

| | | |
|---|---|---|
| 8,396,926 B1 * | 3/2013 | Oliver et al. ............... 709/206 |
| 2004/0227971 A1 * | 11/2004 | Clough et al. ............ 358/1.14 |
| 2005/0015594 A1 * | 1/2005 | Ashley et al. ............. 713/168 |
| 2005/0091485 A1 | 4/2005 | Imai |
| 2005/0097332 A1 | 5/2005 | Imai |
| 2005/0198356 A1 * | 9/2005 | Delaney et al. ........... 709/232 |
| 2005/0228986 A1 | 10/2005 | Fukasawa et al. |
| 2006/0279771 A1 * | 12/2006 | Ludwig et al. ............ 358/1.15 |
| 2006/0279772 A1 * | 12/2006 | Ludwig et al. ............ 358/1.15 |
| 2007/0150727 A1 * | 6/2007 | Miyazawa ................ 713/158 |
| 2007/0189303 A1 | 8/2007 | Sunada |
| 2008/0082677 A1 | 4/2008 | Miyazawa et al. |
| 2009/0089811 A1 * | 4/2009 | Ferlitsch .................. 719/321 |
| 2010/0309510 A1 * | 12/2010 | Hansen ..................... 358/1.15 |
| 2010/0325294 A1 * | 12/2010 | Srinivasan et al. ......... 709/229 |

FOREIGN PATENT DOCUMENTS

| | | | |
|---|---|---|---|
| JP | 2002-215826 A | 8/2002 |
| JP | 2005-130457 A | 5/2005 |
| JP | 2005-130459 A | 5/2005 |
| JP | 2005-311811 A | 11/2005 |
| JP | 2006-014182 A | 1/2006 |
| JP | 2006-165678 A | 6/2006 |
| JP | 2007-094510 A | 4/2007 |
| JP | 2007-181139 A | 7/2007 |
| JP | 2007-213397 A | 8/2007 |
| JP | 2008-090458 A | 4/2008 |
| JP | 2008-135882 A | 6/2008 |
| JP | 2009-200565 A | 9/2009 |

OTHER PUBLICATIONS

Japan Patent Office, Notice of Reasons for Rejection issued for Japanese Patent Application No. 2014-129980 (foreign counterpart of above-captioned patent application), mailed Feb. 24, 2015.

Kauffman, John, Beginning ASP Databases.: Impress Corporation, 2001, pp. 678-679.

* cited by examiner

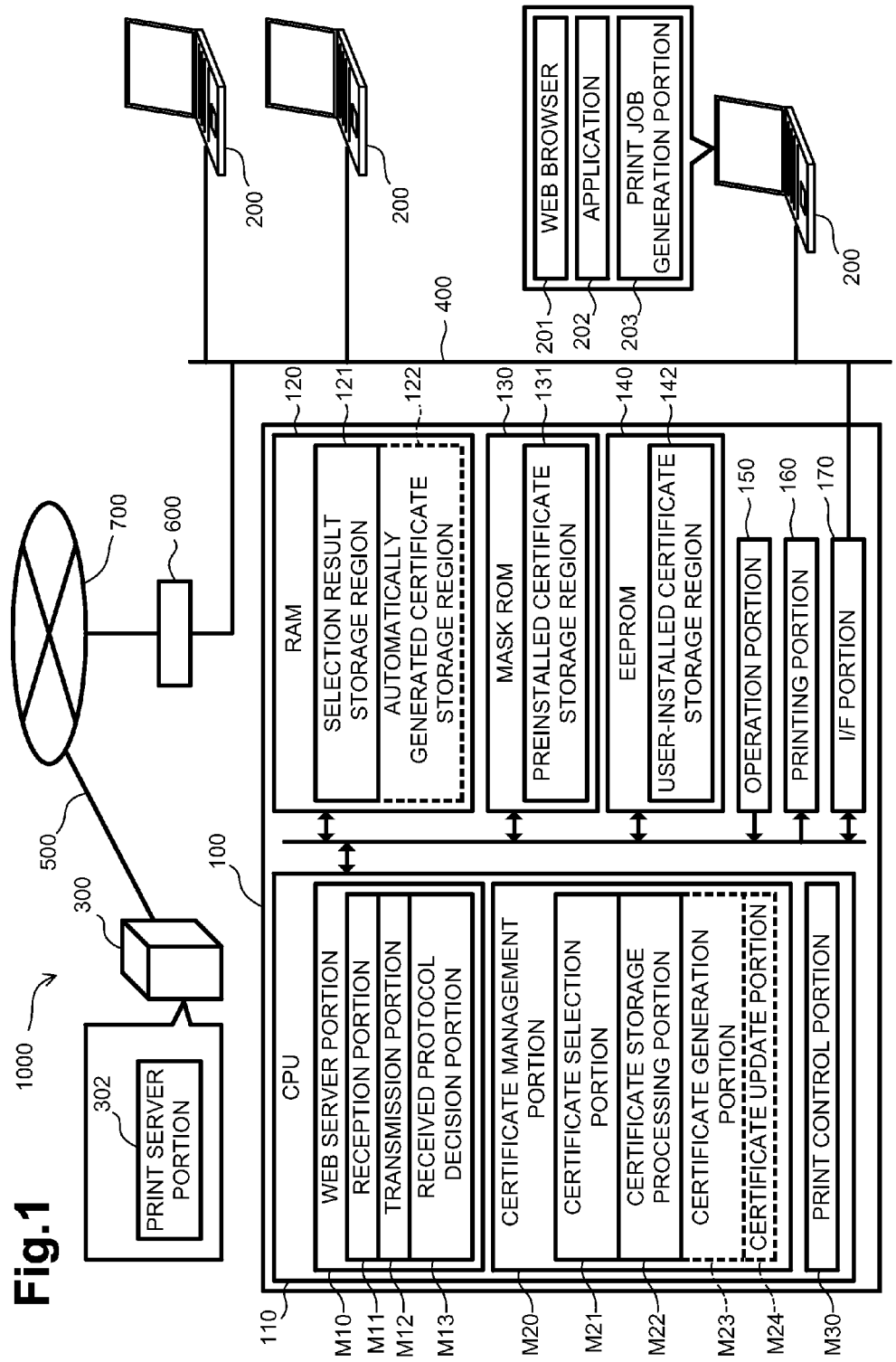

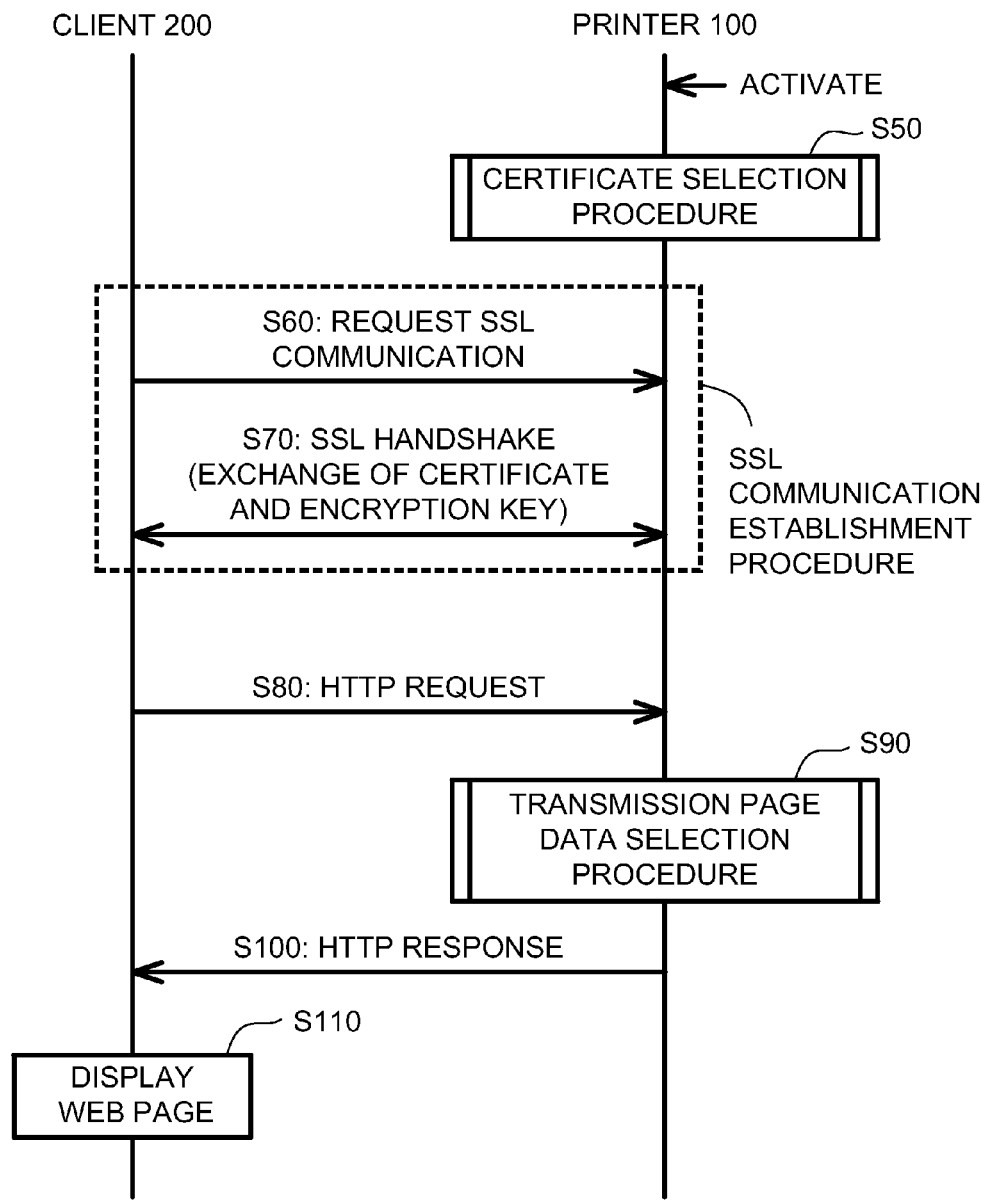

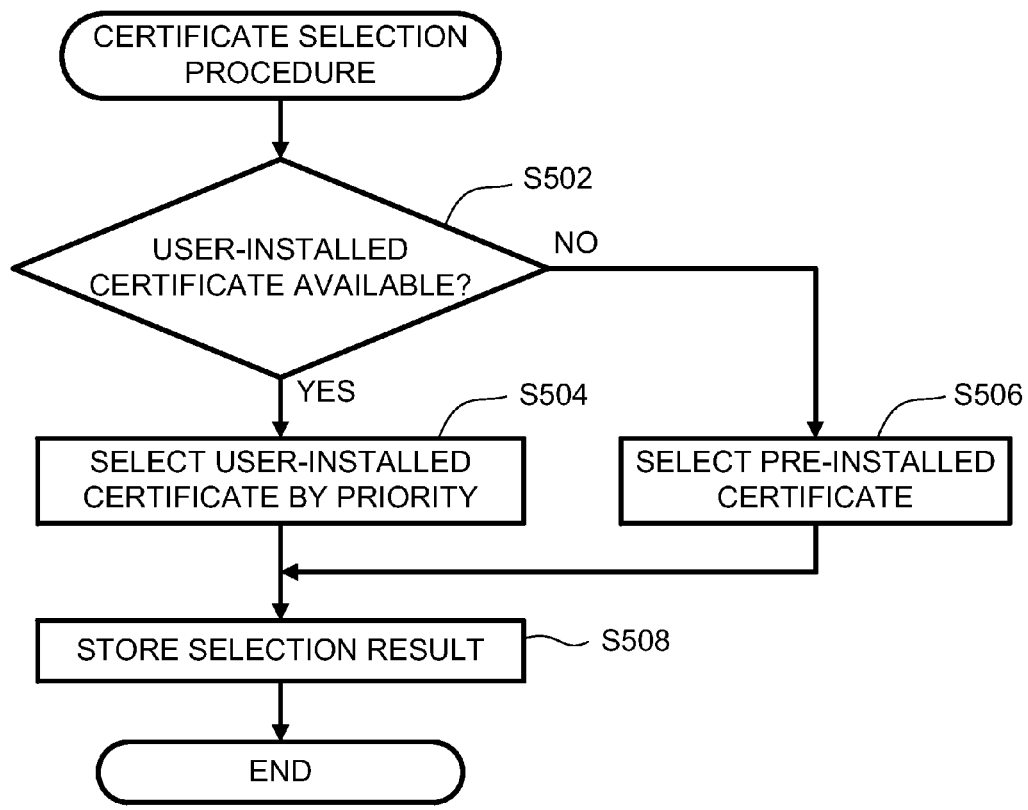

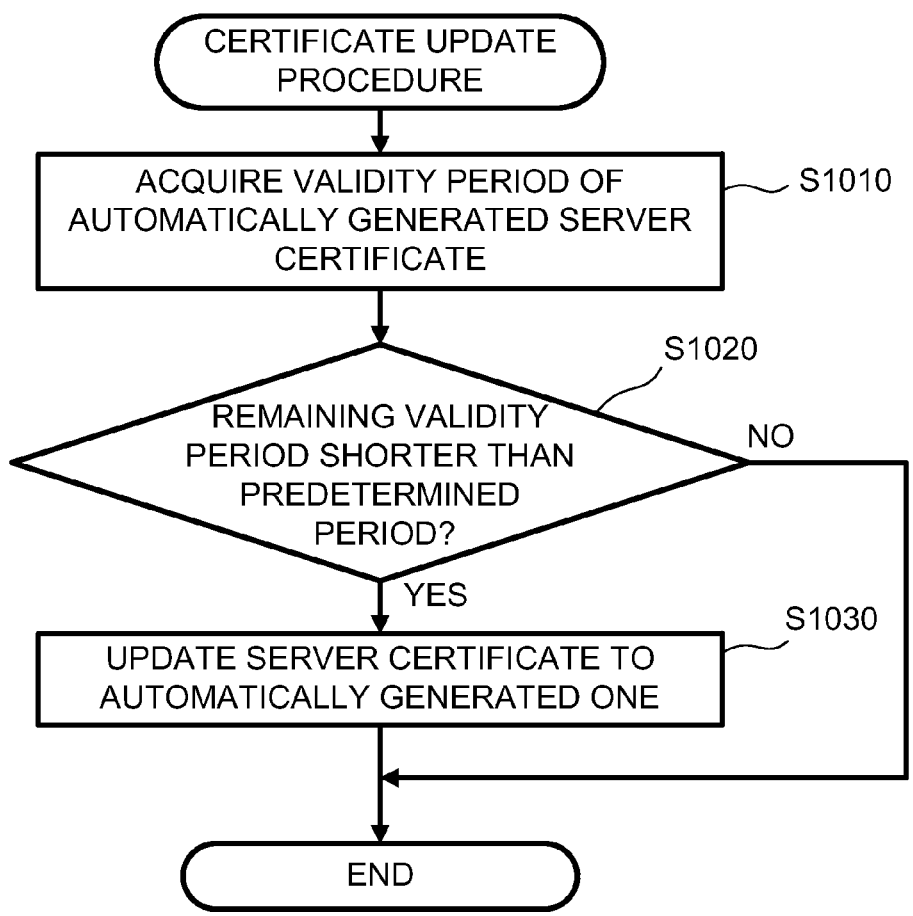

COMMUNICATION APPARATUS THAT COMMUNICATE IN DIFFERENT SECURITY LEVELS AND COMPUTER-READABLE MEDIA FOR CONTROLLING SUCH APPARATUS

CROSS-REFERENCE TO RELATED APPLICATION

The present application claims priority from Japanese Patent Application No. 2011-054069, filed on Mar. 11, 2011, which is incorporated herein by reference.

BACKGROUND OF THE INVENTION

1. Field of the Invention

The present invention relates generally to a communication apparatus for receiving a data request through a plurality of types of communication, each protected by different levels of security.

2. Description of Related Art

In a known apparatus, a plurality of types of communication, each protected by different levels of security, are employed for communication among a plurality of communication apparatuses. For example, a hypertext transfer protocol (HTTP) communication and a hypertext transfer protocol over Secure Socket Layer (SSL) (HTTPS) communication with a higher security level than the HTTP communication are employed for transmitting Web page data from a Web server to a client. SSL is a protocol for performing encrypted communication using an electronic certificate. HTTP is a standard protocol used for communication between a Web server and a client, without employing the SSL. In HTTPS communication, the SSL is implemented as a lower layer of the HTTP.

SUMMARY OF THE INVENTION

The apparatus described above, however, do not account for the Web server being configured to allow the client to request Web page data through both the HTTP communication and the HTTPS communication. When the Web server is configured in this manner, although the client has a higher degree of freedom in processing because the client decides whether to use the HTTPS communication or the HTTP communication, there are also some deficiencies. For example, when the data requested by the client includes specific data that must be secured (for example, Web page data that may contain personal information), the communication security of such specific data may become unprotected. Such problems occur not only for the Web server, but also more broadly for communication apparatus configured to receive data requests through a plurality of types of communication, each protected by different levels of security.

An advantage of embodiments of the present invention is that security of the specific data may be improved in communication apparatuses configured to receive data requests through a plurality of types of communication, each protected by different levels of security.

A communication apparatus may comprise: a processor, wherein the processor may be configured to comprise: a reception portion configured to receive a first data request transmitted through a first security level communication, and a second data request transmitted through a second security level communication, the second security level being more secure than the first security level; a decision portion configured to decide, when the reception portion receives a specific data request requesting specific data, whether the specific data request is the first data request or the second data request; and a transmission portion configured to transmit the specific data to an apparatus that is a transmission source of the specific data request when the specific data request is the second data request, and to transmit different data to the apparatus that is the transmission source when the specific data request is the first data request. The different data may differ from the specific data. The different data may contain display information for causing the apparatus that is the transmission source to retransmit the specific data request through the second security level communication.

A non-transitory, computer-readable storage medium may comprise computer-readable instructions for a processor of a communication apparatus. The computer-readable instructions may instruct the processor to perform the steps of: receiving a first data request transmitted through a first security level communication, and a second data request transmitted through a second security level communication, the second security level being more secure than the first security level; deciding, when the reception portion receives a specific data request requesting specific data, whether the specific data request is the first data request or the second data request; and transmitting the specific data to an apparatus that is a transmission source of the specific data request when the specific data request is the second data request, and transmitting different data to the apparatus that is the transmission source when the specific data request is the first data request. The different data may differ from the specific data. The different data may contain display information for causing the apparatus that is the transmission source to retransmit the specific data request through the second security level communication.

A communication apparatus may comprise: a receiver configured to receive a first data request transmitted through a first security level communication, and a second data request transmitted through a second security level communication, the second security level being more secure than the first security level; a decision portion configured to decide, when the reception portion receives a specific data request requesting specific data, whether the specific data request is the first data request or the second data request; and a transmitter configured to transmit the specific data to an apparatus that is a transmission source of the specific data request when the specific data request is the second data request, and transmit different data to the apparatus that is the transmission source when the specific data request is the first data request. The different data may differ from the specific data. The different data may contain display information for causing the apparatus that is the transmission source to retransmit the specific data request through the second security level communication.

According to the configurations described above, apparatus that have transmitted specific data requests to the communication apparatus through the first security level communication may acquire the data that is different from the specific data, and, upon acquiring the different data, readily may retransmit, specific data requests through the second security level communication. As a result, although specific data requests may be transmitted to the communication apparatus through the first security level communication, the specific data may be transmitted through the second security level communication. The foregoing configurations restrict the specific data from being transmitted through the communication of a lower security level, thereby improving the security for the specific data.

BRIEF DESCRIPTION OF THE DRAWINGS

For a more complete understanding of embodiments of the present invention, needs satisfied thereby, and the objects, features, and advantages thereof, reference now is made to the following descriptions taken in connection with the accompanying drawings.

FIG. 1 is a block diagram depicting a general configuration of a network system according to one embodiment.

FIGS. 2A and 2B are sequence diagrams depicting a communication procedure between a client and a printer.

FIG. 3 is a flowchart of a certificate selection procedure according to one embodiment.

FIG. 10 is a flowchart of a certificate update procedure.

DETAILED DESCRIPTION OF EMBODIMENTS OF THE INVENTION

A. First Embodiment

1. Configuration of Network System

Figure 2A:
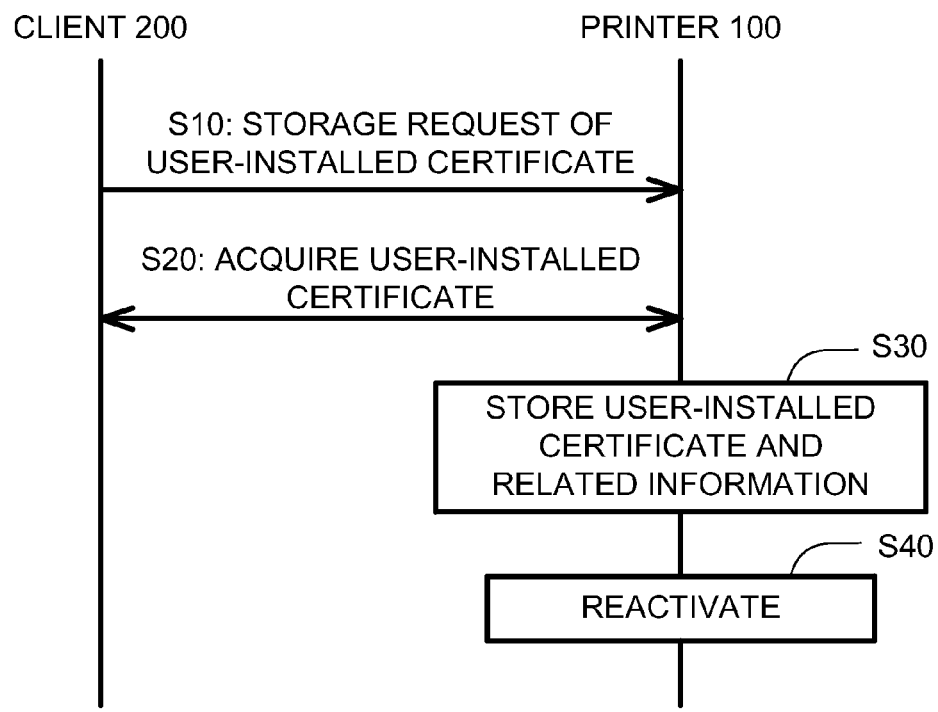

FIG. 1 is a block diagram depicting a general configuration of a network system 1000 according to a first embodiment. The network system 1000 may comprise a printer 100 and a computer acting as a client (hereinafter "client") 200 and a computer acting as a server (hereinafter "server") 300. The printer 100 and the client 200 may be connected to a first local area network 400. The server 300 may be connected to a second local area network 500. The first local area network 400 may be connected to the internet 700 through a firewall 600. The second local area network 500 may be connected to the internet 700. The firewall 600 may be a known switch or computer having a function of the firewall.

The client 200 may execute a program installed therein, to thereby perform functions of: a Web browser 201; an application program 202, such as making documents and images; and a print job generation portion 203. The print job generation portion 203 may receive print data and a printing instruction from the application program 202, and may generate a print job for printing the print data. More specifically, the print job generation portion 203 may be a printer driver compatible with the printer 100, or a driver compatible with an external print service (not shown), which is described hereafter.

The server 300 may execute a server program to thereby perform a function of a print server portion 302, including providing the external print service to the client 200.

When the external print service is not employed, the printer driver compatible with the printer 100 may be installed in the client 200 as the print job generation portion 203. The print job generation portion 203 may generate a print job that may be interpreted by the printer 100, and may transmit the print job to the printer 100. The printer 100 may perform printing in accordance with the received print job.

When the external print service is employed, the driver compatible with the external print service may be installed in the client 200 as the print job generation portion 203. A user of the client 200 may register specific information (for example, an account name and a password), as well as information of the printer 100, in the server 300. The print job generation portion 203 may generate a print job that can be interpreted by the server 300, and may transmit the print job to the server 300. This print job may include the aforementioned specific information and information for indentifying the printer 100. The printer 100 may request a print job from the server 300 upon recognizing a printing request from the client 200 by a notice from the server 300, or by periodical inquiry to the server 300. The server 300 may generate a print job that may be interpreted by the printer 100 on the basis of the print job, which is received from the print job generation portion 203 of the client 200, and the server 300 may transmit the print job to the printer 100. The printer 100 may perform printing in accordance with the received print job.

Employing the external print service may be advantageous because, for example, when the user of the client 200 utilizes a plurality of types of printers, the user may avoid the necessity of installing different printer drivers for each of the printers as the print job generation portion 203.

To request a print job from the server 300, the printer 100 may require the specific information registered in the server 300 by the client 200. Accordingly, a user of the client 200 may register the specific information in the printer 100 before utilizing the external print service. For the registration of the specific information, the user may access a user interface provided by a Web server portion M10 (to be subsequently described) of the printer 100 in the form of a Web page, through the Web browser 201 of the client 200.

Communication between the client 200 and the server 300, as well as between the server 300 and the printer 100, may be performed in a form of encrypted communication that utilizes the SSL (hereinafter, "SSL communication" where appropriate). For the SSL communication, a higher security level may be secured than that for non-encrypted communication that does not employ the SSL (hereinafter, "non-encrypted communication" where appropriate).

The printer 100 may comprise a central processing portion (CPU) 110; a random access memory (RAM) 120, which is a volatile memory; a mask read-only memory (mask ROM) 130, which is an non-rewritable non-volatile memory; an electrically erasable programmable read-only memory (EEPROM) 140, which is a rewritable non-volatile memory; an operation portion 150 including buttons for accepting an operation of a user; a printing portion 160 that forms an image on a printing medium by a known method, such as laser or ink jet printing; and an interface (I/F) portion 170 for connection to the network.

The CPU 110 may execute computer programs stored in the mask ROM 130, to thereby perform functions of the Web server portion M10, a certificate management portion M20, and a print control portion M30.

The Web server portion M10 may act as an HTTP server that may provide a user interface for performing various settings for the printer 100 to the client 200 in the form of a Web page. The Web server portion M10 may comprise a reception portion M11, a transmission portion M12, and a received protocol decision portion M13.

The reception portion M11 may receive an HTTP request from the client 200. The transmission portion M12 may transmit an HTTP response to the client 200, in accordance with the HTTP request. The reception portion M11 and the transmission portion M12 may be implemented with the SSL as a lower layer protocol of the HTTP. Accordingly, the reception portion M11 may be configured to receive the HTTP request through the SSL communication. The reception portion M11 also may be configured to receive the HTTP request through the non-encrypted communication. The transmission portion M12 may be configured to transmit the HTTP response through the SSL communication, as a response to the HTTP request received through the SSL communication. The transmission portion M12 also may be configured to transmit the HTTP response through the non-encrypted communication, as a response to the HTTP request received through the non-encrypted communication.

When the reception portion M11 receives the HTTP request, the received protocol decision portion M13 may determine whether the HTTP request has been transmitted from the client 200 through the SSL communication or through the non-encrypted communication.

In the connection procedure of the SSL communication (e.g., the SSL handshake), a server certificate may be employed. The server certificate may be an electronic certificate containing a public key, owner information and signer information associated with the public key, and information representing a term of validity. The owner information may identify the owner of the public key. The signer information may identify a signer, i.e., a person who claims that the owner of the public key is the person identified by the owner information. The server certificate may be stored in a server (for example, printer 100 acting as a Web server) together with a secret key associated with the server certificate.

The server certificate to be handled by the printer 100 may be classified as follows, depending on the method in which the certificate is stored in the printer 100:
 (1) server certificate stored in the printer 100 in accordance with a storage instruction of the user (hereinafter, user-installed certificate), and
 (2) server certificate stored in the printer 100 during the manufacturing process of the printer 100 (hereinafter, preinstalled certificate).

The certificate management portion M20 may manage the server certificate. The certificate management portion M20 may comprise a certificate selection portion M21 and a certificate storage processing portion M22. The certificate management portion M20 further may comprise a certificate generation portion M23 and a certificate update portion M24. The configuration comprising the certificate generation portion M23 and the certificate update portion M24 is described hereafter in more detail.

The certificate selection portion M21 may perform a certificate selection procedure, in which the server certificate to be used for performing the SSL communication with the client 200 is selected in advance of a connection procedure of the SSL communication (for example, when the printer 100 is activated).

The certificate storage processing portion M22 may perform a certificate storage procedure, in which the server certificate is stored in a predetermined storage region in accordance with a storage instruction of the user. The server certificate stored by the certificate storage processing portion M22 may correspond to the user-installed certificate.

The print control portion M30 may receive a print job and cause the printing portion 160 to perform printing in accordance with the received print job. The print control portion M30 may be configured to receive the print job from the client 200. The print control portion M30 also may be configured to receive the print job from the server 300, when the external print service is performed.

The RAM 120 may serve as a buffer region for temporarily storing data when the CPU 110 executes a processing. The RAM 120 also may comprise a selection result storage region 121, in which information indicating a selection result of the server certificate may be stored when the certificate selection portion M21 performs the certificate selection procedure. The RAM 120 further may comprise an automatically generated, certificate storage region 122. The configuration comprising the automatically generated, certificate storage region 122 is described hereafter in more detail.

The mask ROM 130 may contain various programs and data to be utilized by the CPU 110. The mask ROM 130 may comprise a preinstalled certificate storage region 131, in which the preinstalled certificate is stored. Providing the preinstalled certificate storage region 131 in the mask ROM 130 may allow for a reduced capacity requirement of the EEPROM 140, when compared with the preinstalled certificate storage region 131 provided in the EEPROM 140, which may be more costly than the mask ROM 130.

The EEPROM 140 may be used for storing setting information of the printer 100. The EEPROM 140 may comprise a user-installed certificate storage region 142. In the user-installed certificate storage region 142, the user-installed certificate may be stored by the certificate storage processing portion M22. The user-installed certificate storage region 142 may be configured to store a plurality of user-installed certificates. Although the preinstalled certificate storage region 131 may be provided in the mask ROM 130 in one embodiment, in other embodiments, the preinstalled certificate storage region 131 may be provided in the EEPROM 140 in a region different from the user-installed certificate storage region 142.

2. Communication Procedure between Client 200 and Printer 100

FIGS. 2A and 2B are sequence diagrams depicting a communication procedure between the client 200 and the printer 100. FIG. 2A is a sequence diagram depicting steps of the certificate storage procedure. FIG. 2B is a sequence diagram depicting steps of the communication procedure between the Web browser 201 and the Web server portion M10.

(i) Certificate Storage Procedure

The certificate storage processing portion M22 may perform the certificate storage procedure in response to a storage request of the user-installed certificate, made to the printer 100 for storing the server certificate in the user-installed certificate storage region 142. As depicted in FIG. 2A, the user of the printer 100 (for example, manager of first local area network 400) may operate the client 200 to transmit the storage request of the user-installed certificate from the client 200 to the printer 100 (step S10).

The user-installed certificate to be stored in the certificate storage procedure may be classified as follows, depending on the signer:
 (1) server certificate signed by a public certification authority (public CA) (hereinafter, public CA-signed certificate), and
 (2) server certificate signed by the user (hereinafter, user-signed certificate). In this procedure, the signature of the user also is called a signature of a private certification authority (private CA).

In addition, an acquisition procedure, in which the certificate storage processing portion M22 may acquire the user-installed certificate to be stored in the certificate storage procedure, may be classified in one of the following three acquisition procedures:

(A) The certificate storage processing portion M22 may generate a secret key and a certificate signing request (CSR). The user may transmit the CSR to the public CA and acquire encrypted data of the public CA-signed certificate from the public CA. The certificate storage processing portion M22 then may decode and acquire the public CA-signed certificate by using the secret key and the encrypted data.

(B) The certificate storage processing portion M22 may generate the secret key and the CSR. The certificate storage processing portion M22 may sign on the CSR, in accordance with an instruction of the user, and generate the user-signed certificate. When generating the user-signed certificate, a private CA certificate for importing into the Web browser 201 of the client 200 may be generated and provided to the client 200.

(C) The certificate storage processing portion M22 may import a server certificate and may export a secret key, for example, to client 200.

The certificate storage processing portion M22 may perform the aforementioned acquisition procedure, exchanging necessary information with the user through communication with the client 200 (step S20). The information exchanged with the user may comprise, for example, a particular name necessary for generating the CSR. The certificate storage processing portion M22 may store the user-installed certificate, upon acquiring the user-installed certificate, in the user-installed certificate storage region 142 of the EEPROM 140 in association with the secret key (step S30).

The certificate storage processing portion M22 also may store various information related to the user-installed certificate in the EEPROM 140, together with the user-installed certificate (step S30). For example, the certificate storage processing portion M22 may store information for identifying the type of acquisition procedure of the user-installed certificate (e.g., one of acquisition procedures A, B, or C) in the EEPROM 140 in association with the user-installed certificate. Further, the certificate storage processing portion M22 may accept a designation instruction for designating the particular user-installed certificate to be utilized, when a plurality of user-installed certificates are stored in the user-installed certificate storage region 142. The certificate storage processing portion M22 may store user designation information for identifying the user-installed certificate designated by the user in the EEPROM 140, upon accepting the designation instruction from the user.

Following step S30, the certificate storage processing portion M22 may reactivate the printer 100 (step S40) and finish the certificate storage procedure.

In the certificate storage procedure, the exchange of information between the certificate storage processing portion M22 and the user may be performed when the user accesses the user interface, provided in the form of the Web page by the Web server portion M10 of the printer 100, using the Web browser 201 of the client 200.

(ii) Certificate Selection Procedure

The communication procedure between the Web server portion M10 of the printer 100, which provides various user interfaces to the user of the client 200 in the form of the Web page and the Web browser 201 of the client 200, now is described in more detail.

As depicted in FIG. 2B, the certificate selection portion M21 may perform the certificate selection procedure (step S50) in advance of the communication procedure between the Web browser 201 and the Web server portion M10 (for example, upon activating the printer 100). Activation of the printer 100 may comprise turning on the power and reactivation. When the certificate storage procedure is finished, the printer 100 may be reactivated, and, therefore, the certificate selection procedure may be performed immediately after the reactivation.

FIG. 3 is a flowchart depicting the certificate selection procedure. At the start of the certificate selection procedure, the certificate selection portion M21 may determine whether the user-installed certificate is available (step S502). The certificate selection portion M21 may determine that the user-installed certificate is available when the user-installed certificate storage region 142 contains at least one user-installed certificate that has not yet expired. The certificate selection portion M21 may decide that the user-installed certificate is unavailable when no user-installed certificate that has not expired is stored in the user-installed certificate storage region 142.

The certificate selection portion M21 may select, upon deciding that the user-installed certificate is available (YES at step S502), the server certificate to be utilized among the available user-installed certificates, in accordance with the priority (step S504).

The priority of the user-installed certificates is given below, in order from highest priority to lowest priority:
1. user-installed certificate identified by the user designation information,
2. user-installed certificate acquired through the acquisition procedure A,
3. user-installed certificate acquired through the acquisition procedure C, and
4. user-installed certificate acquired through the acquisition procedure B.

The public CA-signed certificate may be deemed more reliable than the user-signed certificate. Here, the user-installed certificate acquired through acquisition procedure A is a public CA-signed certificate. The user-installed certificate acquired through acquisition procedure B is a user-signed certificate. The user-installed certificate acquired through acquisition procedure C may be a public CA-signed certificate or a user-signed certificate. The priority may be determined in consideration of the above, such that the user's designation instruction may be given priority when the user's designation instruction is stored, and the public CA-signed certificate may be given a higher priority than the user-signed certificate when the user's designation instruction is not stored. When only one user-installed certificate is available, that user-installed certificate may be selected.

Upon deciding that the user-installed certificate is unavailable (NO at step S502), the certificate selection portion M21 may select the preinstalled certificate as the server certificate to be utilized (step S506). Thus, the server certificate to be utilized may be selected, such that the user-installed certificate may be utilized with priority when the user-installed certificate is available, and the preinstalled certificate may be utilized only when the user-installed certificate is unavailable.

Upon selecting the server certificate to be utilized, the certificate selection portion M21 may store information indicating the selection result in the selection result storage region 121 of the RAM 120 (step S508), and may finish the certificate selection procedure. The information indicating the selection result may be stored in the selection result storage region 121, for example, as bind information that may associate the selected server certificate with the SSL protocol implemented in the Web server portion M10.

(iii) Communication Procedure between Web Browser 201 and Web Server Portion M10

Referring to FIG. 2B, the communication procedure between the Web server portion M10 of the printer 100, which provides various user interfaces to the user of the client 200 in the form of the Web page, and the Web browser 201 of the client 200 now is described in more detail.

The Web page may be identified by a uniform resource locator (URL). The URL generally is expressed as follows:
<scheme>://<host>/<path>
The <scheme> may designate an acquisition method of the resource, and, for example, a protocol name may be stated. The <host> may designate a Web server, and, for example, an IP address or a domain name assigned to the Web server may be stated. The <path> may be represented by a resource name (location) on the Web server.

The user may designate a URL on a display screen (e.g., a browser screen) of the Web browser 201 of the client 200, thereby transmitting a request for a Web page (HTTP request), requesting the data on the Web page identified by the URL (hereinafter, simply page data). The designation of the URL by the user may be performed, for example, by (1) inputting the URL in a URL portion of a browser screen, (2) selecting an item associated with the URL in the Web page displayed on a browser screen (e.g., a character string or an image, and hereinafter referred to as link item), and (3) selecting a URL registered in advance.

The Web server portion M10 of the printer 100 may be compatible with both the SSL communication and the non-encrypted communication described above. The user may decide which communication of the SSL communication and the non-encrypted communication to use. The user may designate a URL in which the <scheme> may be expressed as "http" for utilizing the non-encrypted communication, and a URL in which the <scheme> may be expressed as "https" for utilizing the SSL communication.

For example, when the printer 100 is assigned an IP address of "192.168.11.16," a URL as "http://192.168.11.16/" or "https://192.168.11.16/" may be designated for requesting the page data of the top page of the Web pages provided by the Web server portion M10.

The URL of the page data of the Web page provided by the Web server portion M10, other than the top page, may be designated, for example, by selecting a link item displayed on the Web page provided by the Web server portion M10 starting with the top page. In an embodiment, the URL associated with the link item on the Web page provided by the Web server portion M10 may be represented in a relative path format, i.e., a format from which the <scheme> and the <host> are excluded. When the user designates a URL of the relative path format, it may be determined that the user has designated the same <scheme> and <host> as those designated when the page data of the Web page containing the corresponding link item was acquired.

When the user has designated a URL in which the <scheme> is expressed as "https," the Web browser 201 of the client 200 may transmit a SSL communication request to the Web server portion M10 of the printer 100 before transmitting the HTTP request, as depicted in FIG. 2B (step S60). The SSL communication request may be followed by the SSL handshake between the Web browser 201 and the Web server portion M10 (step S70). Hereafter, the procedure of steps S60 and S70 may be referred to as SSL communication establishment procedure, where appropriate.

The SSL handshake is a procedure for establishing the SSL communication, and may include transmission of the server certificate from the Web server portion M10 to the Web browser 201 and exchange of the encryption key (common key) therebetween. The Web server portion M10 may utilize the server certificate selected in the certificate selection procedure (FIG. 3) as the server certificate to be transmitted to the Web browser 201 in the SSL handshake. In the SSL handshake, the Web browser 201 may examine the server certificate transmitted from the Web server portion M10 to decide whether the server certificate is reliable.

A public CA certificate for examining the reliability of the public CA-signed certificate may be preinstalled in the Web browser 201. The user may import into the Web browser 201 the private CA certificate for examining the reliability of the user-signed certificate. The Web browser 201 may determine whether the server certificate is reliable through the examination of those CA certificates. The public CA-signed certificate and the user-signed certificate may be determined to be reliable when the Web browser 201 has the corresponding CA certificate; the preinstalled certificate, however, is generally determined to be unreliable.

Upon determining that the server certificate transmitted from the Web server portion M10 is unreliable, the Web browser 201 may display a notice page on the browser screen announcing that the server certificate is unreliable.

Figure 4:
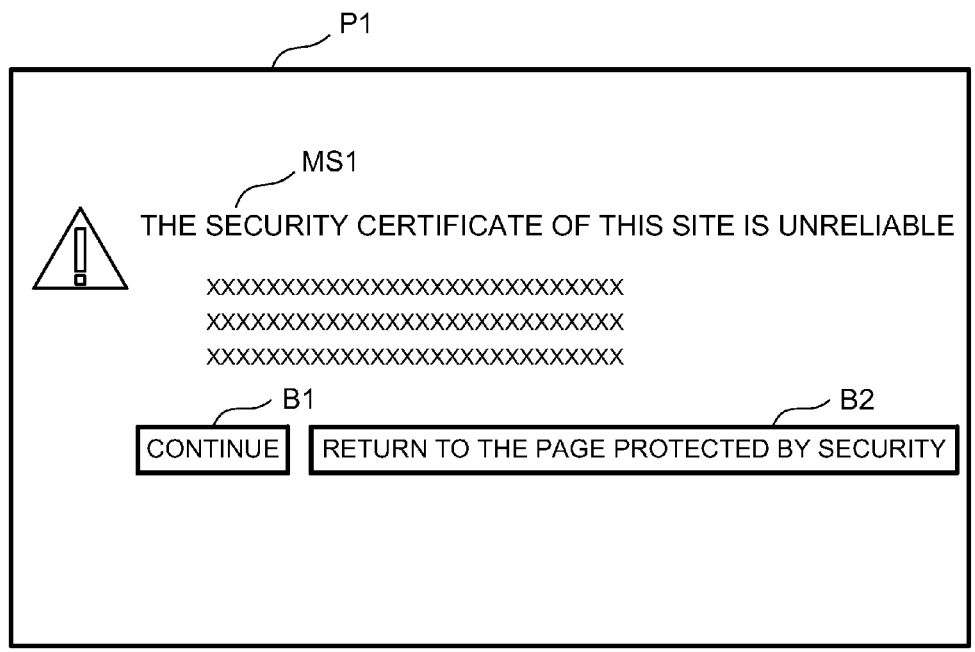
FIG. 4 is a drawing depicting an example of a notice page.

FIG. 4 depicts an example of the notice page. The notice page P1 may display a message MS1 expressing that the server certificate is unreliable, and two instruction acceptance buttons, B1 and B2. The instruction acceptance button B1 may be pressed by the user when the user wishes to continue the SSL handshake. The instruction acceptance button B2 may be pressed by the user when the user wishes to suspend the SSL handshake. If the user presses the instruction acceptance button B1, the Web browser 201 may continue the SSL handshake with the server certificate transmitted from the Web server portion M10. If the user presses the instruction acceptance button B2, the Web browser 201 may suspend the SSL handshake and display the Web page that was displayed before starting the SSL handshake.

When the SSL handshake is completed and the SSL communication is established, the Web browser 201 may transmit the HTTP request for the page data identified by the user-designated URL to the Web server portion M10 through the SSL communication (step S80). The HTTP request may include the description of the portion of the <path> in the URL.

When the reception portion M11 of the Web server portion M10 receives the HTTP request, the Web server portion M10 may perform a transmission page data selection procedure (step S90). In the transmission page data selection procedure, the page data to be contained in a HTTP response that is to be transmitted (hereinafter, transmission page data) may be selected. Details of the transmission page data selection procedure now are described in more detail.

Once the transmission page data is selected, the transmission portion M12 of the Web server portion M10 may transmit the HTTP response containing the selected page data to the Web browser 201 through the SSL communication (step S100). Using the page data contained in the received HTTP response, the Web browser 201 may display the Web page on the browser screen (step S110).

Alternatively, when the user has designated a URL in which the <scheme> is expressed as "http," the procedures of steps S80 through S100 depicted in FIG. 2B may be performed without performing the SSL communication establishment procedure. In other words, the Web browser 201 may transmit the HTTP request for the page data identified by the user-designated URL to the Web server portion M10 through the non-encrypted communication (step S80). Upon receipt of the HTTP request, the Web server portion M10 may perform the transmission page data selection procedure (step S90). In addition, the transmission portion M12 of the Web server portion M10 may transmit the HTTP response containing the selected page data to the Web browser 201 through the non-encrypted communication (step S100). Using the page data contained in the received HTTP response, the Web browser 201 may display the Web page on the browser screen (step S110).

Figure 5:
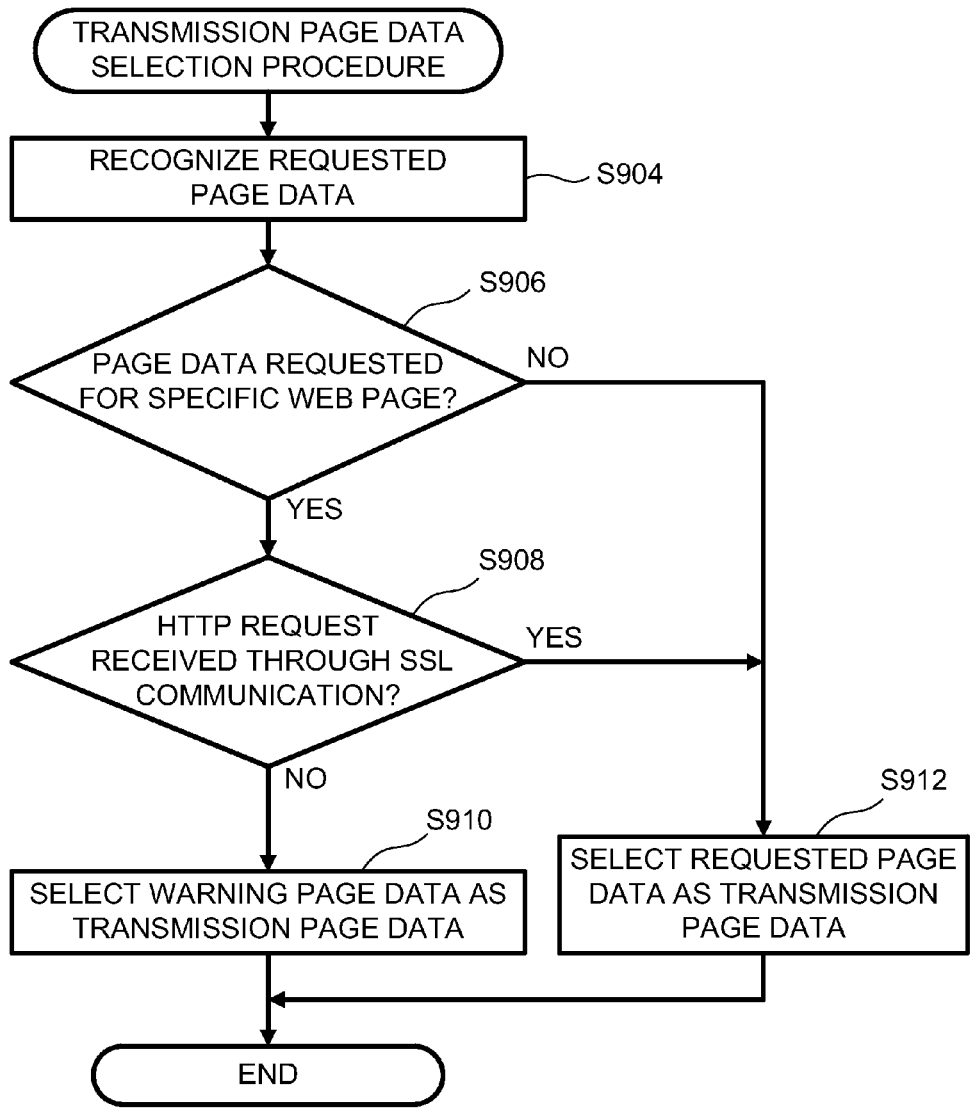
FIG. 5 is a flowchart of a transmission page data selection procedure.

The transmission page data selection procedure (step S90) now is described in more detail. FIG. 5 is a flowchart depicting the transmission page data selection procedure. The transmission page data selection procedure may begin when the reception portion M11 of the Web server portion M10 receives the HTTP request. As depicted in FIG. 5, the Web server portion M10 may recognize the page data requested by the received HTTP request (hereinafter, requested page data, where appropriate) (step S904), and decide whether the requested page data is page data of a specific Web page (hereinafter, specific page data) (step S906).

The specific page data may represent a Web page that may contain specific information, such as personal information, which must be secured. In an embodiment, the specific Web page may correspond to the page that provides the user interface for registering into the printer 100 the specific information for use of the external print service (hereinafter, specific information registration page).

Figure 6:
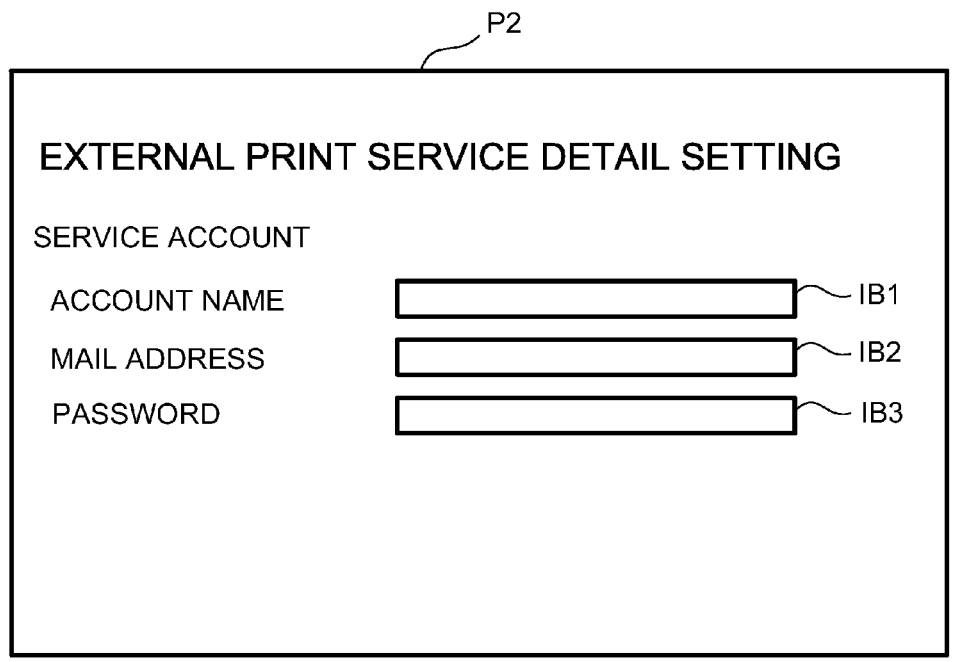
FIG. 6 is a drawing depicting an example of a specific information registration page.

FIG. 6 depicts an example of the specific information registration page. The specific information registration page P2 may display input boxes, IB1, IB2, and IB3, to be used for inputting the specific information (for example, an account name, a mail address, and a password). When the specific information is already registered, the page data of the specific information registration page P2 contains the specific information.

When the requested page data is the specific page data (YES at step S906 in FIG. 5), the received protocol decision portion M13 of the Web server portion M10 may determine whether the HTTP request has been received through the SSL communication (step S908). More specifically, the received protocol decision portion M13 may acquire a destination port number of the HTTP request. The destination port number may be written on the header of the transmission control protocol (TCP) packet containing the HTTP request. The received protocol decision portion M13 may decide that the HTTP request has been received through the SSL communication if the acquired destination port number is, for example, "443". If the acquired destination port number is not "443" (for example, "80"), the received protocol decision portion M13 may determine that the HTTP request has not been received through the SSL communication, i.e., has been received through the non-encrypted communication.

When the HTTP request has been received through the SSL communication (YES at step S908), the Web server portion M10 may select the specific page data, which may be the requested page data, as the transmission page data (step S912). When the HTTP request has not been received through the SSL communication (NO at step S908), the Web server portion M10 may select the page data of a warning page as the transmission page data, instead of the specific page data, which is the requested page data (step S910).

Figure 7:
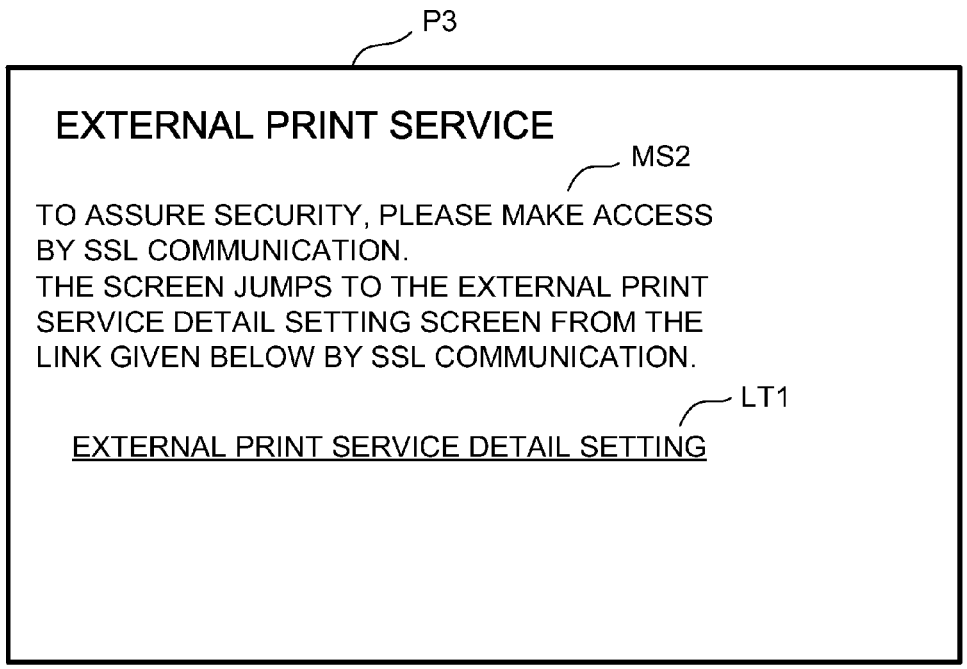
FIG. 7 is a drawing depicting an example of a warning page.

FIG. 7 depicts an example of the warning page. The warning page P3 may display a link item LT1 to request retransmission and a message MS2. The link item LT1 to request retransmission may be associated with a URL that causes the Web browser 201 to retransmit the HTTP request for the specific page data through the SSL communication (hereinafter, retransmission URL). Specifically, the <scheme> of this URL may be https, the <host> of this URL may be the IP address of the printer 100, and the <path> of this URL may be the resource name that identifies the specific page data. The Web server portion M10 may acquire the IP address assigned to the printer 100 to thereby generate the retransmission URL. The Web server portion M10 also may create, in advance, the warning page data containing the link item LT1 to request retransmission and the message MS2. The message MS2 may urge the user to select the link item LT1 to request retransmission so as to retransmit the HTTP request for the specific page data through the SSL communication. The data of the link item LT1 to request retransmission contained in the page data of the warning page P3 may be display information that causes the Web browser 201 (client 200) to retransmit the HTTP request for the specific page data through the SSL communication.

Alternatively, when the requested page data is not specific page data (NO at step S906 in FIG. 5), the Web server portion M10 may select the requested page data as the transmission page data, regardless of whether the HTTP request has been received through the SSL communication (step S912). Upon completing either step S910 or S912, the transmission page data selection procedure may finish.

The contents of the browser screen that are displayed when an access is made through the Web browser 201 of the client 200 to the Web server portion M10 of the printer 100 now are described in more detail.

Figure 8:
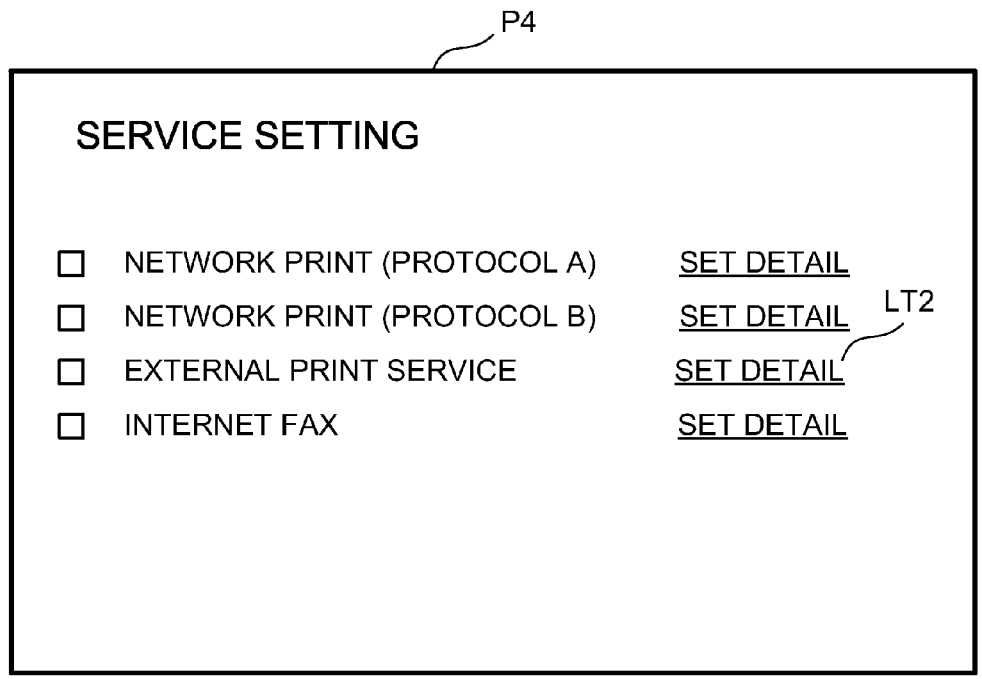
FIG. 8 is a drawing depicting an example of a Web page different from a specific Web page.

FIG. 8 depicts an example of a Web page that is different from the specific Web page. The page data of the Web page P4 does not contain the specific information that must be secured. The Web page P4 may include a link item LT2 associated with a URL of the relative path format for identifying the specific page data (page data of specific information registration page P2 (see FIG. 6), which is the specific Web page). Because the Web page P4 is not the specific Web page, the Web browser 201 may acquire the page data of the Web page P4 regardless of whether the SSL communication is utilized.

Upon acquiring the page data of the Web page P4 through the SSL communication, when the Web browser 201 displays the Web page P4 on the browser screen and the user selects the link item LT2 on the Web page P4, the Web browser 201 may transmit the HTTP request for the specific page data to the Web server portion M10 through the SSL communication. In this procedure, the Web browser 201 may acquire the specific page data through the SSL communication and display the specific information registration page P2 (see FIG. 6) on the browser screen.

In contrast, upon acquiring the page data of the Web page P4 through the non-encrypted communication, when the Web browser 201 displays the Web page P4 on the browser screen and the user selects the link item LT2 on the Web page P4, the Web browser 201 may transmit the HTTP request for the specific page data to the Web server portion M10 through the non-encrypted communication. In this procedure, the Web browser 201 may acquire the page data of the warning page P3 (see FIG. 7) through the non-encrypted communication and display the warning page P3 on the browser screen. The user may cause the Web browser 201 to acquire the specific page data through the secured SSL communication by selecting the link item LT1 to request retransmission on the warning page P3. Consequently, even though the HTTP request for the specific page data may be transmitted to the Web server portion M10 through the non-encrypted communication, the specific page data may subsequently be transmitted through the SSL communication.

As is apparent from the foregoing description, when the Web browser 201 has requested the specific page data through the non-encrypted communication, the printer 100 may transmit the page data of the warning page P3 that is different from the specific page data. In other words, the printer 100 is not configured to transmit the specific page data through the non-encrypted communication despite being configured to accept a data request both through the non-encrypted communication and through the SSL communication. Thus, the security of the specific information (for example, personal information) that may be contained in the specific page data may be improved.

To perform the SSL communication establishment procedure, the printer 100 may use the preinstalled certificate, stored in the preinstalled certificate storage region 131, to thereby establish communication. Accordingly, the specific page data (specific information) may be transmitted despite the user-installed certificate not being stored in the user-installed certificate storage region 142. Such an arrangement may alleviate the inconvenience imposed on the user. Conversely, when the user-installed certificate is stored in the user-installed certificate storage region 142, the user-installed certificate may be selected with priority, and the specific page data (specific information), therefore, may be transmitted using the electronic certificate in accordance with the user's intention.

The printer 100 may select the server certificate before the SSL communication establishment procedure (see FIG. 2B) (e.g., upon activating the printer 100), and may store the information indicating the selection result in the selection result storage region 121. Accordingly, the SSL communication establishment procedure may be performed quickly by using the server certificate according to the information indicating the selection result.

By performing the certificate selection procedure, the printer 100 may select automatically the appropriate server certificate in accordance with the differences in reliability of the server certificates and the intentions of the user. Consequently, the inconvenience imposed on the user may be reduced.

By using the destination port number of the received HTTP request, the printer 100 readily may determine whether the HTTP request has been received through the SSL communication.

In the foregoing description, the printer 100 is exemplary of a communication apparatus according to embodiments of the present invention. The user-installed certificate storage region 142 is exemplary of a certificate storage region and a first certificate storage region. The preinstalled certificate storage region 131 is exemplary of a certificate storage region and a second certificate storage region. Further, the selection result storage region 121 is exemplary of a selection result storage region.

B. Second Embodiment

The configuration and operation of the printer according to the second embodiment are substantially similar to those of the printer 100 according to the first embodiment, except for the aspects described here below.

1. Configuration of Printer

As indicated by broken lines in FIG. 1, the certificate management portion M20 of the printer according to the second embodiment may comprise the certificate generation portion M23 and the certificate update portion M24, in addition to the structure of the certificate management portion M20 of the printer 100. Further, the RAM 120 of the printer according to the second embodiment may comprise the automatically generated certificate storage region 122, in addition to the structure of the RAM 120 of the printer 100. Conversely, the mask ROM 130 of the printer according to the second embodiment may not comprise the preinstalled certificate storage region 131. Thus, the preinstalled certificate may not be stored in the printer according to the second embodiment.

2. Certificate Selection Procedure

Figure 9:
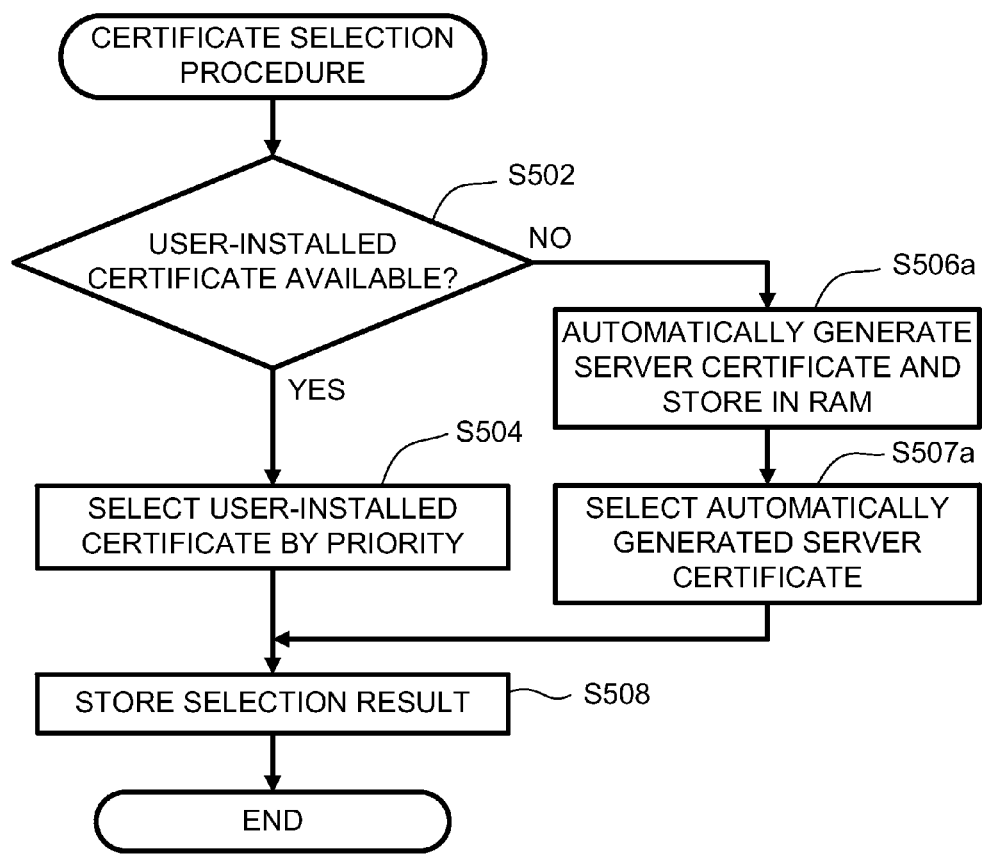
FIG. 9 is a flowchart of a certificate selection procedure according to one embodiment.

FIG. 9 is a flowchart depicting the certificate selection procedure according to the second embodiment. The certificate selection procedure according to the second embodiment may differ from that of the first embodiment (see FIG. 3) by including steps S506a and S507a (see FIG. 9) in place of step S506 in the certificate selection procedure according to the first embodiment. The details of the remaining steps are the same as those of the certificate selection procedure according to the first embodiment (see FIG. 3).

At step S506a, the certificate generation portion M23 automatically may generate the server certificate, and store the server certificate in the automatically generated certificate storage region 122 of the RAM 120. Hereinafter, the server certificate that may be generated automatically by the certificate generation portion M23 may be referred to as automatically-generated server certificate. The server certificate generated automatically by the certificate generation portion M23 may be equivalent to the preinstalled certificate according to the first embodiment. Nevertheless, the server certificate generated automatically by the certificate generation portion M23 may have a shorter validity term than the preinstalled certificate (for example, 10 days).

At step S507a, the certificate selection portion M21 may select the server certificate generated automatically at step S506a as the server certificate to be utilized.

3. Certificate Update Procedure

FIG. 10 is a flowchart depicting the certificate update procedure. Through the certificate update procedure, the server certificate generated automatically by the certificate generation portion M23 may be updated. The certificate update procedure may be periodically performed at regular intervals (for example, every 12 hours) by the certificate update portion M24.

Upon starting the certificate update procedure, the certificate update portion M24 may acquire the validity period of the automatically generated server certificate (step S1010). The certificate update portion M24 may decide whether the remainder of the acquired validity period, i.e., the period between the current time point and the expiration, is equal to or less than a predetermined period (for example, one day) (step S1020). When the remaining validity period is equal to or less than the predetermined period (YES at step S1020), the certificate update portion M24 may generate automatically a new server certificate as performed at step S506a (see FIG. 9), and overwrite the new server certificate over the existing automatically generated server certificate stored in the automatically-generated certificate storage region 122 (RAM 120), to thereby update the automatically-generated server certificate (step S30). At this stage, the certificate update procedure may terminate, and, at the same time, the secret key associated with the server certificate also may be updated. When it is determined that the remaining validity period is greater than the predetermined period (NO at step S1020), the certificate update portion M24 may terminate the certificate update procedure.

In the foregoing description, the automatically-generated certificate storage region 122 exemplifies the certificate storage region and the second certificate storage region according to embodiments of the present invention.

When the user-installed certificate is not stored in the user-installed certificate storage region 142, the printer according to the second embodiment may generate automatically the server certificate, thereby preventing the SSL communication from being disabled because of the absence of the server certificate.

Further, the printer according to the second embodiment may update automatically the automatically-generated server certificate, thereby preventing the SSL communication from being disabled because of expiration of the validity period of the automatically generated electronic certificate. Such an arrangement may be particularly advantageous, for example, when the printer 100 remains turned on for an extended period of time.

Further, because the preinstalled certificate is not stored, the capacity requirement of the non-volatile memory region of the printer 100 (e.g., the capacity of the mask ROM 130) may be reduced.

C. Modifications

The invention is not limited to the above-described embodiments, but may be implemented in various forms with various modifications without departing from the scope and spirit of the invention. Although not an exhaustive listing of modifications, several exemplary modifications now are described in more detail.

While the Web server portion M10 of the printer 100 according to the foregoing embodiments is compatible with the HTTP communication and the HTTPS communication, embodiments of the present invention also may be applicable to different communication protocols, provided that a data request may be handled on the basis of two types of protocols having different security levels. Examples of combinations of two protocols having different security levels include a file transfer protocol (FTP) and a file transfer protocol over SSL (FTPS), a simple network management protocol version 1 (SNMPv1) and a simple network management protocol version 3 (SNMPv3), and a telnet and a telnet/secure shell (SSH).

The SSL communication referred to in the foregoing embodiments may be an encrypted communication established through the handshake procedure utilizing the electronic certificate. Alternatively, a common key may be stored in the apparatus of the parties communicating with each other instead of employing the electronic certificate, and the encrypted communication may be performed using the common key.

Although a plurality of types of server certificates may be stored in the printer 100 according to the foregoing embodiments, the printer 100 may be configured to store only one type of server certificate.

Although the printer 100 according to the foregoing embodiments performs the certificate selection procedure upon activating the printer 100, the certificate selection procedure may be performed after receipt of an SSL communication request.

In the printer 100 according to the foregoing embodiments, the received protocol decision portion M13 may decide whether the HTTP request has been received through the SSL communication based on the destination port number, which is the information transmitted with the HTTP request, written on the header of the TCP packet containing the HTTP request. Alternatively, the decision may be made based on information contained in the HTTP request (e.g., the <scheme> of the URL written in a referrer column of the HTTP request).

Although communication apparatus having the function of the Web server portion M10 are exemplified by the printer 100 in the foregoing embodiments, other types of communication apparatus may be employed. Examples of such other communication apparatus may comprise image processing apparatus, such as a scanner, a facsimile machine, and a multifunction printer having a plurality of functions (e.g., printing, scanning, and the like). A personal computer, a router, and a switch also may be employed.

Alternatively, a part of the configuration implemented by hardware in the above-described embodiments may be implemented by software. Conversely, a part of the configuration implemented by software in the above-described embodiments may be implemented by hardware.

While embodiments of the invention have been described in connection with various exemplary structures and illustrative embodiments, it will be understood by those skilled in the art that other variations and modifications of the structures, configurations, and embodiments described above may be made without departing from the scope of the invention. Other structures, configurations, and embodiments shall be apparent to those skilled in the art from a consideration of the specification, including the accompanying figures, or from practice of embodiments of the invention disclosed herein. It is intended that the specification and the described examples are illustrative, with the true scope of the invention being defined by the following claims.

What is claimed is:

1. A communication apparatus comprising:
a memory storing computer readable instructions; and
a processor configured to execute the computer readable instructions, wherein the computer readable instructions cause the processor to implement processes comprising:
receiving a first data request transmitted through a first security level communication;
receiving a second data request transmitted through a second security level communication, the second security level being more secure than the first security level;
determining, when receiving a specific data request requesting specific data, whether the specific data request is the first data request or the second data request;
transmitting the specific data to an apparatus that is a transmission source of the specific data request, when the specific data request is the second data request;
transmitting different data to the apparatus that is the transmission source when the specific data request is the first data request,
wherein the different data differs from the specific data,
wherein the different data comprises display information for causing the apparatus that is the transmission source to retransmit the specific data request through the second security level communication, and wherein the display information includes a link item to retransmit the specific data request through the second security level communication and a message prompting selection of the link item;

storing an electronic certificate in a certificate storage region, wherein the second security level communication comprises a protocol allowing communication to be established through a connection procedure using the electronic certificate;

transmitting the specific data through the communication established through the connection procedure using the electronic certificate; and updating the generated electronic certificate, when a period before expiration of the generated electronic certificate is less than a predetermined period.

2. The communication apparatus according to claim 1, wherein the computer readable instructions cause the processor to implement processes further comprising:

storing the electronic certificate in the certificate storage region in accordance with a storage instruction, wherein the certificate storage region comprises:

a first certificate storage region configured to store a first electronic certificate to be stored by the certificate storage processing portion; and a second certificate storage region configured to store a second electronic certificate to be stored without utilization of the certificate storage processing portion;

selecting the first electronic certificate, when the first electronic certificate is stored in the first certificate storage region, and selecting the second electronic certificate, when the first electronic certificate is not stored in the first certificate storage region; and transmitting the specific data through the communication established through the connection procedure using the selected electronic certificate.

3. The communication apparatus according to claim 2, the computer readable instructions causing the processor to implement processes further comprising:

storing a selection result of the selecting process in a selection result storage region; and selecting the electronic certificate in advance of the connection procedure for receiving the second data request and storing information indicating the selection result in the selection result storage region.

4. The communication apparatus according to claim 1, the computer readable instructions causing the processor to implement processes further comprising:

deciding whether the specific data request is the first data request or the second data request based on information transmitted with the specific data request or information contained in the specific data request.

5. The communication apparatus according to claim 1, wherein the computer readable instructions cause the processor to implement processes further comprising:

generating the electronic certificate when the electronic certificate is not stored in the certificate storage region.

6. The communication apparatus according to claim 1, further comprising:

a printer configured to perform printing in accordance with a received print job, wherein the specific data contains setting information for performing setting of the printer.

7. The communication apparatus according to claim 6, further comprising:

a network interface connected to a server, the server providing an external print service, wherein the specific data comprises data for registering into the communication apparatus the specific information for use of the external print service.

8. A non-transitory, computer-readable storage medium comprising computer-readable instructions for a processor of a communication apparatus, the computer-readable instructions instructing the processor to perform the steps of:

receiving a first data request transmitted through a first security level communication;

receiving a second data request transmitted through a second security level communication, the second security level being more secure than the first security level;

determining whether the specific data request is the first data request or the second data request, when receiving a specific data request requesting specific data;

transmitting the specific data to an apparatus that is a transmission source of the specific data request, when the specific data request is the second data request;

transmitting different data to the apparatus that is the transmission source, when the specific data request is the first data request, wherein the different data differs from the specific data, wherein the different data contains display information for causing the apparatus that is the transmission source to retransmit the specific data request through the second security level communication, and wherein the display information includes a link item to retransmit the specific data request through the second security level communication and a message prompting selection of the link item;

storing an electronic certificate in a certificate storage region, wherein the second security level communication comprises a protocol allowing communication to be established through a connection procedure using the electronic certificate;

transmitting the specific data through the communication established through the connection procedure using the electronic certificate; and updating the generated electronic certificate, when a period before expiration of the generated electronic certificate is less than a predetermined period.

9. A system comprising:
a printer;
a client terminal; and
a server,
wherein the client terminal comprises:
a display;
a first interface; and
a first processor coupled to the display and the first interface;
wherein the printer comprises:
a printing device configured to perform printing in accordance with a received print job;
a web server;
a second interface;
a memory storing specific data including account information and warning data including a message and a link item, wherein the message includes a particular text to urge selection of the link item, and wherein the link item indicates a location of the specific data and includes a command for transmitting, in a secured communication protocol, a particular request for accessing the specific data including account information; and a second processor, coupled to the second interface and the memory, wherein the server comprises:
a third interface;
a third processor coupled to the third interface;

wherein the first processor is configured to:
transmit, to the web server of the printer through the first interface, the particular request for accessing the specific data;

wherein the second processor is configured to:
receive, from the client terminal through the second interface, the particular request;
determine whether the particular request is transmitted through a first security level communication or a second security level communication, the second security level communication being more secure than the first security level communication;
generate a first response to the particular request when the particular request is transmitted through the first security level communication, wherein the first response includes the warning data described in HTML format and is transmitted to the client terminal through the first security level communication, the warning data including the message and the link item;
generate a second response to the particular request when the particular request is transmitted through the second security level communication, wherein the second response includes the specific data described in HTML format and is transmitted to the client terminal through the second security level communication;

wherein the first processor is further configured to:
receive the first response from the printer through the first security level communication;
control the display to display the warning data including the message and the link item in HTML format;
transmit a command including the particular request for accessing the specific data in accordance with the location of the specific data, in response to selection of the link item;
receive the second response including the specific data through the second security level communication;
control the display to display the specific data in HTML format;
transmit the specific data to the server through the second security level communication;
transmit a print job to the server through the second security level communication, the print job including the specific data and a destination information assigned to the printer;

wherein the second processor is further configured to:
transmit a printing request to the server through the second security level communication, the printing request including a request for transmitting the print job to the printer and the specific data in association with the print job;

wherein the third processor is configured to:
receive the specific data from the client terminal through the second security level communication;
store the received specific data in a memory of the server;
receive the print job transmitted from the client terminal through the second security level communication;
receive the printing request from the printer through the second security level communication, the printing request including the specific data stored in the memory of the printer;
transmit the print job to the printer through the second security level communication based on the destination information included in the received print job when the received specific data included in the printing request is identical to the specific data stored in the memory of the server, wherein the second processor is further configured to:
receive the print job transmitted from the server through the second security level communication; and
control the printing device to print an image based on the received print job.

10. The system according to claim 9 wherein the second processor is further configured to:
store an electronic certificate in a certificate storage region, wherein the second security level communication comprises a protocol allowing communication to be established through a connection procedure using the electronic certificate; and
transmit the specific data through the communication established through the connection procedure using the electronic certificate.

11. The system according to claim 10, wherein the certificate storage region comprises:
a first certificate storage region configured to store a first electronic certificate to be stored by a certificate storage processing portion; and
a second certificate storage region configured to store a second electronic certificate to be stored without utilization of the certificate storage processing portion;
wherein the second processor is further configured to:
select the first electronic certificate, when the first electronic certificate is stored in the first certificate storage region, and select the second electronic certificate, when the first electronic certificate is not stored in the first certificate storage region; and
transmit the specific data through the communication established through the connection procedure using the selected electronic certificate.

* * * * *